United States Patent [19]

Kauder

[11] E Re. 30,338

[45] Reissued Jul. 15, 1980

[54] ORGANOTIN STABILIZER COMPOSITION CONTAINING MORE THAN 20 PERCENT TIN AND RESIN COMPOSITIONS CONTAINING THE SAME

[75] Inventor: Otto S. Kauder, New York, N.Y.

[73] Assignee: Argus Chemical Corporation, Brooklyn, N.Y.

[21] Appl. No.: 937,677

[22] Filed: Aug. 28, 1978

Related U.S. Patent Documents

Reissue of:

[64] Patent No.: 3,632,538
Issued: Jan. 4, 1972
Appl. No.: 635,658
Filed: May 3, 1967

[51] Int. Cl.[2] ..... C08K 5/58

[52] U.S. Cl. ..... 260/23 XA; 260/45.75 S; 252/400 R

[58] Field of Search ..... 260/23 XA, 45.75 S; 252/400

[56] References Cited

U.S. PATENT DOCUMENTS

| | | | |
|---|---|---|---|
| 2,641,588 | 6/1953 | Leistner | 260/45.85 |
| 2,746,946 | 5/1956 | Weinberg | 260/45.75 |
| 2,997,454 | 8/1961 | Leistner | 260/45.75 |
| 3,021,302 | 2/1962 | Frey | 260/45.75 |
| 3,108,126 | 10/1963 | Crauland | 260/429.7 |
| 3,113,069 | 12/1963 | Sijpestein | 260/429.7 |
| 3,189,575 | 9/1965 | Horn | 260/45.75 |
| 3,412,120 | 11/1968 | Considine | 260/429.7 |
| 3,424,717 | 1/1969 | Gottlieb | 260/45.75 |

*Primary Examiner*—V. P. Hoke

[57] ABSTRACT

A polyvinyl chloride resin stabilizer is provided having a high concentration of tin, in the range from about 20 to about 35% by weight, and a high concentration of sulfur, within the range from about 10 to about 25% sulfur, comprising [an] *a di* organotin *di* alpha- or beta-mercapto carboxylic acid ester and an organotin sulfide.

Polyvinyl chloride resin compositions are also provided containing these stabilizers.

16 Claims, No Drawings

ORGANOTIN STABILIZER COMPOSITION CONTAINING MORE THAN 20 PERCENT TIN AND RESIN COMPOSITIONS CONTAINING THE SAME

Matter enclosed in heavy brackets [ ] appears in the original patent but forms no part of this reissue specification; matter printed in italics indicates the additions made by reissue.

This invention relates to a stabilizer composition for polyvinyl chloride resins and to polyvinyl chloride resin compositions having improved resistance to deterioration at 350° F. and more particularly, to a stabilizer composition comprising an organotin mercapto carboxylic acid ester and an organotin sulfide having a high concentration of tin, and to polyvinyl chloride resin compositions containing such stabilizers.

The stabilizing effectiveness of organotin stabilizers for polyvinyl chloride resins is generally associated with organotin groups, tin content, and, to some degree, sulfur content. The higher the relative proportion of these, the more effective the organotin compound usually is as a stabilizer. However, there are exceptions to the rule that make prediction fallible.

The organotin sulfides, for example, offer the highest tin and sulfur contents per organotin group, and yet they are not the best stabilizers, and have never found a place as a commercial stabilizer. Despite their considerably lower tin and sulfur contents, the most effective organotin stabilizers presently in use, and the recognized standard for judging other organotin stabilizers, are the organotin mercapto carboxylic acid esters. The great majority of these materials, and certainly all of the most commonly used commercial products, are either liquid at room temperatures or are low-melting solids. The addition of even a small proportion of a liquid stabilizing additive has unfavorable effects on the heat distortion temperature and the impact strength of polyvinyl chloride resins. As a result, it is difficult to provide a high degree of chemical stability and a high degree of structural stability, problems which generally go hand in hand when rigid resins are subjected to high temperature conditions. To attain both of these goals, it is necessary to use as small an amount of the stabilizer as possible, so that the structural strength of the resin is least affected.

The use of the organotin mercapto carboxylic acid esters as stabilizers for polyvinyl chloride resins is well known, and is generally set forth in such early patents as U.S. Pat. Nos. 2,753,325 to Leistner et al., issued June 26, 1956, 2,641,596 to Leistner et al., issued June 9, 1953, and 2,648,650 to Weinberg et al., issued Aug. 11, 1953.

The organotin sulfides are described in U.S. Pat. No. 2,746,946 to Weinberg et al., dated May 22, 1956. Polymeric organotin sulfides having a high proportion of tin and sulfur by weight have also been suggested. Examples of such materials are given in U.S. Pat. No. 3,021,302 to Frey, dated Feb. 13, 1962, which discloses polymeric condensation products of hydrocarbon stannonic acid, hydrocarbon thiostannonic acid and co-condensation products of these materials. However, all of these materials have suffered from one or another failing, which until now has prevented their coming into general commercial use.

Similar disclosures of polymeric organotin compounds, which generally include a chain of tin atoms connected through oxygen or sulfur atoms, are set out in U.S. Pat. Nos. 2,597,920, dated Apr. 15, 1962; 2,626,953, dated Jan. 27, 1953; 2,628,211, dated Feb. 10, 1953; 2,746,946, dated May 22, 1956; 3,184,430, dated May 18, 1956; and 2,938,103, dated May 24, 1960.

U.S. Pat. No. 2,809,956, dated Oct. 15, 1957, discloses polymeric organotin compounds which include mercapto ester groups attached to tin, having the general formula:

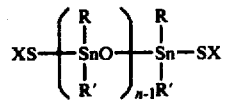

wherein SX can be a mercapto; mercapto alcohol or ester; or mercapto acid ester group. These compounds, however, have been found not to be as effective stabilizers as the monomeric organotin mercapto acid esters, such as dibutyltin bis(isooctyl thioglycolate).

U.S. Pat. Nos. 3,078,390, 3,196,129 and 3,217,004 describe a series of thioacetal and thioketal organotin carboxylate salt stabilizers which can be prepared in situ by the reaction of thioacetal and thioketal carboxylic acids with dihydrocarbontin oxides or sulfides or the corresponding monohydrocarbon- or trihydrocarbontin compounds.

According to the present invention, a particularly effective polyvinyl chloride resin stabilizer composition is provided having a relatively high concentration of tin, within the range from about 20 to about 35% Sn, and a relatively high concentration of sulfur, within the range from about 10 to about 25% S, and comprising (a) [an organotin] *a diorganotin di* $\alpha$- or $\beta$-mercapto carboxylic acid ester, and (b) an organotin sulfide.

The organotin sulfides useful in this combination each contain groups linked to tin only through carbon, and a sulfide sulfur group, =S, wherein the sulfide sulfur valences are linked to the same tin atom or to different tin atoms. Each compound contains per tin atom one or two hydrocarbon or heterocyclic groups linked to tin through carbon. For best results, and to obtain a synergistic stabilizing effectiveness, at least one of the compounds of the combination of this invention should contain only one hydrocarbon group per tin atom, linked to tin through a carbon atom. This combination generally improves the initial color of a resin composition during heating, i.e., during the first thirty minutes of a heat test, and can also improve the long-term stability before final charring.

One type of the organotin sulfides useful in this invention can be defined by the formula:

$$R_2SnS$$

wherein R is a hydrocarbon group linked to tin through carbon, and containing from one to about eight carbon atoms. The atomic ratio of sulfur to tin is 1:1.

Another group of organotin sulfides of this invention are polymers which can be illustrated by the formulae

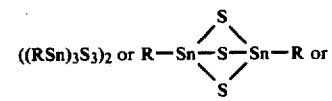

-continued

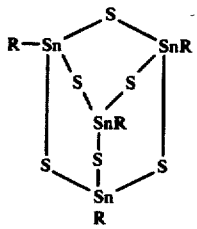

in which each tin atom is linked to three sulfur atoms and each sulfur is linked to two tin atoms, and x is a number from one to about 100.

Another type has the recurring group

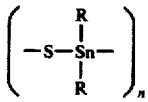

where n is the number of units in the chain, and ranges up to 100 and more.

Another way of defining the $R_2SnS$ type is:

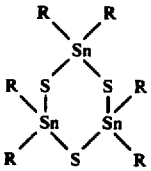

The R's are as defined above. The above formulae are not intended to limit the structure of the compound in any way. The structures can be straight chain, branched chain, cyclic, or any combination thereof.

The R hydrocarbon groups in the above formulae can be selected from among alkyl, aryl, cycloalkyl, alkyl cycloalkyl, cycloalkylalkyl, and arylalkyl having from one to eight carbon atoms.

The preferred R groups are alkyl groups having from four to eight carbon atoms.

The organotin sulfides used in this invention are well known to the art and can be prepared by a number of procedures described in earlier references which are known to the art. For example, hydrogen sulfide can be bubbled, at about 40° C. into a slurry of hydrocarbontin oxide in water or an organic solvent (such as methanol, acetone, or toluene). The insoluble oxide is converted to a solution or dispersion of the sulfide and the reaction is terminated when the entire system is liquefied.

Another useful technique is the displacement of hydrocarbontin halide (e.g. $Bu_2SCl_2$) by an aqueous alkali metal sulfide or ammonium sulfide. Hydrocarbontin sulfides also can be prepared from the interaction of hydrocarbontin halide with other sulfur compounds than sulfides, such as sodium thiosulfite and ammonium polysulfide. These reactions provide unstable intermediates that decompose to the hydrocarbontin sulfide plus another product characteristic of the particular starting materials, e.g. alkali metal sulfide or free sulfur.

All the above preparative methods can be summarized in the transformations below, where the n-butyltin compounds shown are representative of the entire class of organotin compounds:

$$(Bu_2SnO)_= + mH_2S \longrightarrow m/n(Bu_2SnS)_n + mH_2O$$

$$Bu_2SnCl_2 + Na_2S \longrightarrow \frac{1}{n}(Bu_2SnS)_n + NaCl$$

$$2BuSnCl_2 + 3Na_2S \longrightarrow \frac{1}{x}((BuSn)_2S_2)_n + 6NaCl$$

$$Bu_2SnCl_2 + Na_2O_3 + NaOH \longrightarrow \frac{1}{n}(Bu_2SnS)_n + 2NaCl + NaHSO_3$$

$$Bu_2SnCl_2 + (NH_4)_2S_4 \longrightarrow \frac{1}{n}(Bu_2SnS)_n + 2NH_4Cl + 2S$$

When these preparations are carried out in an aqueous medium, a small proportion of the sulfur atoms in the hydrocarbontin sulfides are replaced by oxygen atoms, resulting in sulfur-deficient products having average compositions represented by the empirical formulae $$(R_2SnS_pO_{1-p})$$

and $((RSn)_2S_rO_{2-r})_x$, where p is at least 0.85 and r is at least 1.5.

In the stabilizer composition of this invention these sulfides are fully as effective as the pure oxygen-free sulfides, and wherever organotin sulfides are mentioned the term is intended to include both the pure compounds and the sulfur-deficient preparations.

There are many other procedures for the preparation of these compounds. The above list of procedures is not intended to be exhaustive. Organotin sulfides prepared by any other procedure would also be useful in the present combination.

The R groups linked to tin through carbon can, for example, be methyl, ethyl, propyl, isopropyl, n-butyl, isobutyl, tert-butyl, sec-butyl, amyl, hexyl, octyl, 2-ethylhexyl, isooctyl, phenyl, benzyl, cumyl, tolyl, xylyl, cyclohexyl, and cyclopentyl.

Preferred examples of organotin sulfides are dipropyltin sulfide, dibutyltin sulfide, butyltin sesquisulfide $$((BuSn)_2S_3)_x$$

(x=from 1 to 100 or higher), di-n-pentyltin sulfide, hexyltin sesquisulfide, dihexyltin sulfide, isooctyltin sesquisulfide, di-2-ethylhexyltin sulfide, heptyltin sesquisulfide, di(isobutyl)tin sulfide, n-octyltin sesquisulfide, di-(n-octyltin) sulfide and sec-butyltin sesquisulfide propyltin sesquisulfide, dimethyltin sulfide, isoamyltin sesquisulfide, di(isoamyl)tin sulfide, diisohexyltin sulfide, 2-ethylhexyltin sesquisulfide, 2-ethyl butyltin sulfide.

The above compounds can have any degree of polymerization falling within the above formula.

The [organotin mercapto] *diorganotin dimercapto* acid esters can be monomeric or polymeric, but preferably monomeric. The monomers can be defined as organotin compounds having organic radicals linked to tin only through carbon and sulfur, and have the general formula:

$$[R'_nSn—[S—Z_1—(COOR'')_m]_{4-n}]$$

$$R'_2Sn—[S—Z_1—COOR'')_m]_2 \quad (1)$$

The $S—Z_1—COOR''$ group is derived from an $\alpha$- or $\beta$-mercapto carboxylic acid ester.

[n is an integer from one to two.]

m is the number of COOR″ groups and is an integer from one to four.

R″ is an organic group derived from a monohydric or polyhydric alcohol having from one to about four hydroxyl groups and from about one to about fifteen carbon atoms. If there is more than one COOR″ group, the R″ radicals can be the same or different.

R′ is a hydrocarbon radical having from about one to about eight carbon atoms, preferably from four to eight, and includes the groups defined above for R.

$Z_1$ is a bivalent alkylene radical carrying the S and COOR″ groups, and in addition can contain free carboxylic acid groups, carboxylic acid salt groups and mercapto groups. The $Z_1$ radical has from one to about five carbon atoms.

The $S—Z_1—(COOR'')_m$ groups are derived from mono- or poly α- and β-mercapto carboxylic acid esters by removal of the hydrogen atom of the mercapto group. These include the esters of aliphatic acids which contain at least one mercapto group, such as, for example, esters of mercaptoacetic acid, α- and β-mercaptopropionic acid, α- and β-mercaptobutyric acid and α- and β-mercaptovaleric acid, thiomalic acid, α- and β-mercaptoglutaric acid, mercaptomalonic acid, α- and β-mercaptoadipic acid and α- and β-mercaptopimelic acid.

R″ is an organic group derived from a monohydric or polyhydric alcohol of the formula $R(OH)_{n4}$, where $n_4$ is an integer from one to about four, but is preferably one or two. Thus, R″ can be alkyl, alkylene, alkenyl, aryl, arylene, mixed alkyl-aryl, mixed aryl-alkyl, cycloaliphatic and heterocyclic, and can contain from about one to about fifteen carbon atoms, and can also contain ester groups, alkoxy groups, hydroxyl groups, halogen atoms and other inert substituents. Preferably, R″ is derived from a monohydric alcohol containing from one to about fifteen carbon atoms, such as methyl, ethyl, propyl, s-butyl, n-butyl, t-butyl, isobutyl, octyl, isoctyl, 2-ethylhexyl, 2-octyl, decyl, lauryl, cyclic monohydric alcohols, such as cyclopropanol, 2,2-dimethyl-1-cyclopropanol, cyclobutanol, 2-phenyl-1-cyclobutanol, cyclopentanol, cyclopentenol, cyclohexanol, cyclohexenol, 2-methyl-, 3-methyl-, and 4-methyl-cyclohexanol, 2-phenyl-cyclohexanol, 3,3,5-trimethyl cyclohexanol, cycloheptanol, 2-methyl-, 3-methyl-and 4-methyl cycloheptanol, cyclooctanol, cyclononanol, cyclodecanol, cyclododecanol, or from a dihydric alcohol such as glycols containing from two to about fifteen carbon atoms, including ethylene glycol, propylene glycol, diethylene glycol, dipropylene glycol, tetramethylene glycol, neopentyl glycol and decamethylene glycol, 2,2,4-trimethyl pentane-diol, 2,2,4,4-tetramethyl cyclobutanediol, cyclohexane-1,4-dimethanol, and polyols such as glycerine, triethylol propane, mannitol, sorbitol, erythritol, dipentaerythritol, pentaerythritol, and trimethylol propane.

It is not necessary for the alcohol $R(OH)_{n4}$ to be a single, pure compound. Many of the commercially available and inexpensive alcohol mixtures are suitable and advantageous. The branched-chain primary alcohols made by the Oxo process and known as isooctyl, isodecyl and isotridecyl alcohols are mixtures of isomers, but can be used as if they were single compounds. Other alcohol mixtures that can be used include mixed homologous primary alcohols arising from oxidation of the reaction product of ethylene with triethyl aluminum, isomers and homologous secondary alcohols from the hydration of linear $C_5$ to $C_{15}$ olefins or the oxidation of linear $C_6$ to $C_{15}$ paraffins, isomers and homologous straight-chain and methyl-branched primary alcohols resulting from the application to the Oxo process to $C_6$ to $C_{14}$ linear alpha-olefins, homologous mixtures of reaction products from ethylene oxide with alcohols, phenols or carboxylic acids of the proper carbon content and the like.

These mercapto acid esters, where not known, can be readily prepared by reaction of the mercaptocarboxylic acid esters with the corresponding organotin oxide or chloride. For a more complete explanation of the process for making, and for additional examples of these diorganotin mercapto ester compounds, see U.S. Pat. Nos. 2,648,650 to Weinberg et al., 2,641,596 and 2,752,325 to Leistner, and 3,115,509 to Mack, and Canadian Pat. No. 649,989 to Mack.

The organotin mercapto acid esters containing two different mercapto acid ester groups can be prepared by reacting the desired organotin oxide or chloride with a mixture of the mercapto acid esters, or by heating the two different organotin esters together.

The following organotin thioesters are typical of those coming within the invention:

1.
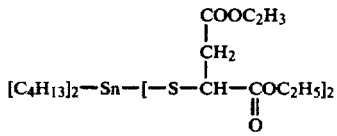

2.
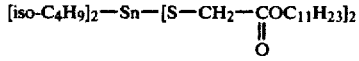

[3.
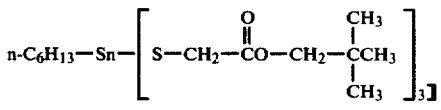

3. [4.]
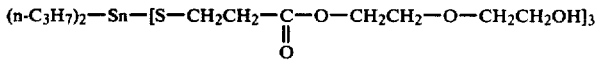

4. [5.]
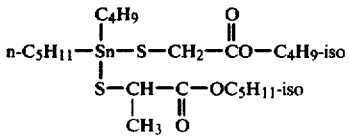

-continued

5. [6.] $(C_4H_9)_2-Sn-[-S-CH_2-\underset{\underset{O}{\|}}{C}-O-C_5H_{11}\text{-iso}]_2$

[7. $\text{iso-}C_4H_9-Sn-[-S-\underset{\underset{CH_3}{|}}{CH}-\underset{\underset{O}{\|}}{C}-O-CH_2CH_2-O-CH_3]_3$ ]

6. [8.] $[\text{n-}C_4H_9]_2-Sn-[-S-CH_2CH_2-\underset{\underset{O}{\|}}{C}-O-CH_2-\underset{\underset{OH}{|}}{CH}-CH_2OH]_2$ 7. [9.] $(\text{iso-}C_3H_7)_2-Sn-(S-CH_2CH_2-\underset{\underset{O}{\|}}{C}-O-CH_2-\overset{\overset{CH_3}{|}}{\underset{\underset{CH_3}{|}}{C}}-CH_2OH)_2$ 8. [10.] $C_4H_9O\underset{\underset{O}{\|}}{C}-CH_2-S-\overset{\overset{\text{iso-}C_4H_9}{|}}{\underset{\underset{\text{iso-}C_4H_9}{|}}{Sn}}-SCH_2\underset{\underset{O}{\|}}{C}OC_4H_9$ 9. [11.] $(\text{iso-}C_4H_9)_2-Sn-[S-\overset{\overset{O}{\|}}{\underset{|}{C}}-O-C_4H_9\text{-iso}-CH-C_4H_9]_2$ 10. [12.] $[CH_3-\overset{\overset{CH_3}{|}}{\underset{\underset{CH_3}{|}}{CH}}-CH_2-]_2-Sn-\left[S-CH_2CH_2-\overset{\overset{O}{\|}}{C}O-\langle S \rangle\right]_2$ 11. [13.] $\text{tert-}C_4H_9-\underset{\underset{C_8H_{17}}{|}}{Sn}-[S-CH_2-COOC_8H_{17}\text{-n}]_2$ 12. [14.] $\text{iso-}C_5H_{11}-\underset{\underset{\langle S \rangle}{|}}{Sn}-[S-CH_2CH_2COOCH_2\underset{\underset{OH}{|}}{CH}-CH_2OH]_2$ 13. [15.] $(\text{iso-}C_3H_7)_2-Sn-\left[S-\underset{\underset{CH_2-COOH}{|}}{CH}-COO(CH_2)_3OH\right]_2$ 14. [16.] $\left[\langle S \rangle\right]_2-Sn-[S-CH_2CH_2COOCH_2CH_2OH]_2$ 15. [17.] $[CH_3]_2Sn-[S-CH_2-COOCH_2CH_3]_3$ 16. [18.] $(C_4H_9)_2-Sn\begin{cases} S-CH_2CH_2-\overset{\overset{O}{\|}}{C}-O-C_8H_{17}\text{-iso} \\ S-CH_2-\underset{\underset{O}{\|}}{C}-O-C_{12}H_{25}\text{-iso} \end{cases}$ 17. [19.] $C_6H_{13}-\overset{\overset{C_6H_{13}}{|}}{\underset{\underset{S-(CH_2)_2-\overset{\overset{O}{\|}}{C}-O-C_3H_7}{|}}{Sn}}-S-CH_2-CH_2-\underset{\underset{O}{\|}}{C}-O-CH_2CH_2OCH_2CH_2O\overset{\overset{O}{\|}}{C}CH_2CH_3$ 18. [20.] $C_5H_{11}-\overset{\overset{C_5H_{11}}{|}}{\underset{\underset{SCH-\underset{\underset{O}{\|}}{C}OC_5H_{11}}{|}}{Sn}}-S-\overset{\overset{CH_3}{|}}{CH_2}-CH_2-\underset{\underset{O}{\|}}{C}-O-(CH_2)_2OH$ 19. [21.] $(C_4H_9)_2-Sn-(S-\overset{\overset{CH_3}{|}}{CH}-COO\overset{\overset{C_4H_9}{|}}{\underset{\underset{C_4H_9}{|}}{Sn}}-S-CH_2COOC_8H_{17})_2$ 20. [22.] $C_5H_{11}-\overset{\overset{C_5H_{11}}{|}}{\underset{\underset{S-CH_2CH_2-COOCH_2CH_3OH}{|}}{Sn}}-S-CH_2CH_2COO-\overset{\overset{C_5H_{11}}{|}}{\underset{\underset{C_5H_{11}}{|}}{Sn}}-S-CH_2COOCH_2OHCH_2OH$ 21. [23.] $(\text{n-}C_5H_{11})_2-\underset{\underset{S-CH_2COOC_4H_9}{|}}{Sn}-S-CH_2COOC_4H_9$ -continued

[24.

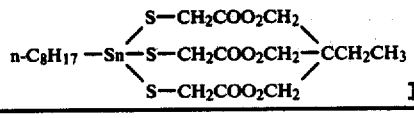

]

Specific combinations of organotin sulfides with organotin mercapto carboxylic esters that can be used according to this invention include the following:

di-n-butyltin sulfide + di-n-butyltin bis(isooctyl thioglycolate)

[di-n-octyltin sulfide + n-butyltin tris(cyclohexyl thioglycolate)]

n-butyltin sesquisulfide + di-n-butyltin bis(di-n-butyl thiomaleate)

n-butyltin sesquisulfide + di-n-octyltin bis(isooctyl thioglycolate)

n-octyltin sesquisulfide + di-n-propyltin bis(2-ethylhexyl beta-mercaptopropionate)

di-n-octyltin sulfide + di-n-octyltin bis(isooctyl thioglycolate)

n-octyltin sesquisulfide + di-n-octyltin bis(isooctyl thioglycolate)

[di-n-octyltin sulfide + n-octyltin tris(isooctyl thiolglycolate)]

[n-octyltin sesquisulfide + n-octyltin tris(isooctyl thioglycolate)]

n-butyltin sesquisulfide + di-n-butyltin bis(isooctyl thioglycolate)

dicyclohexyltin sulfide + di-n-butyltin bis(isooctyl thioglycolate)

cyclohexyltin sesquisulfide + di-n-octyltin bis(isooctyl thioglycolate)

n-propyltin sesquisulfide + dicyclohexyltin bis(cyclohexyl thioglycolate)

di-2-ethylhexyltin sulfide + di-n-butyltin bis(2-ethylbutyl thioglycolate)

[di-n-butyltin sulfide + n-butyltin tris(2-ethoxyethyl alpha-mercaptopropionate)]

di-isobutyltin sulfide + di-isobutyltin bis(tetrahydrofurfuryl beta-mercaptopropionate)

t-butyltin sesquisulfide + di-2-ethylhexyltin bis(methyl thioglycolate)

[phenyltin sesquisulfide + phenyltin tris(phenoxyethyl thioglycolate)]

ethyltin sesquisulfide + di-n-butyltin bis(isooctyl thioglycolate)

[diphenyltin sulfide + ethyltin tris(2-ethylhexanoyloxyethyl thioglycolate)]

isopropyltin sesquisulfide + di-n-butyltin bis(2,2-dimethylpentyl thioglycolate)

isoamyltin sesquisulfide + di-n-propyltin bis(2-octyl alphamercaptopropionate)

n-butyltin sesquisulfide + di-n-butyltin 4,4-isopropylidene di(cyclohexyl thioglycolate)

[di-n-butyltin sulfide + n-butyltin glyceryl tri(thioglycolate)]

The invention is applicable to any polyvinyl chloride resin. The term "polyvinyl chloride" as used herein is inclusive of any polymer formed at least in part of the recurring group

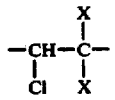

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major porportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,984,593 to Isaksem et al., that is, syndiotactic polyvinyl chloride, as well as atactic and isotactic polyvinyl chlorides.

The stabilizing combinations of this invention, both with and without supplementary stabilizers, are excellent stabilizers for both plasticized and unplasticized polyvinyl chloride resins. When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized linseed oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The stabilizer composition of the invention, including the organotin mercapto acid ester and organotin sulfide, is employed in an amount sufficient to impart the desired resistance to heat deterioration at working temperatures of 350° F. and above. The longer the time and the more rigorous the conditions to which the resin will be subjected during working and mixing, the greater will be the amount required. Generally, as little as 0.25% total of the stabilizer composition by weight of the resin, will improve resistance to heat deterioration.

There is no critical upper limit on the amount, but amounts above about 15% by weight of the resin do not give an increase in stabilizing effectiveness commensurate with the additional stabilizer employed. Preferably, the amount is from about 0.5 to about 5% by weight of the resin.

The proportion of the organotin mercapto acid ester and of the organotin sulfide is sufficient to give a sulfur content in the composition within the range from about 12 to about 25%, and a tin content within the range from about 20 to 35%. For best results an overall sulfur content from about 22% to about 30% by weight of the stabilizer composition is preferred. Accordingly, the proportions by weight of organotin mercapto ester to organotin sulfide will usually be within the range of 20:1 to 1:2 and preferably within the range of 9:1 to 1:1.

The stabilizer combination of the invention is extremely effective when used alone, but it can be employed together with other polyvinyl chloride resin stabilizers, if special effects are desired. The stabilizer combination of the invention in this event will be the major stabilizer, and the additional stablizer will supplement the stabilizing action of the former, the amount of the stabilizer combination being within the range from about 0.25 to about 15 parts by weight per 100 parts of the resin, and the additional stabilizer being in an amount of from about 0.05 to about 10 parts per 100 parts of the resin.

Among the additional metallic stabilizers are included other organotin compounds, polyvalent metal salts of medium and of high molecular weight fatty acids and phenols, with metals such as calcium, tin, cadmium, barium, zinc, magnesium, and strontium. The non-metallic stabilizers include phosphites, epoxy compounds, and the like. Epoxy compounds are especially useful, and typical compounds are described in U.S. Pat. No. 2,997,454.

Generally, the stabilizer composition of this invention can be prepared by mixing the organotin mercapto acid ester with the organotin sulfide, either alone, or with any liquid lubricant or plasticizer to be added to the resin composition with the stabilizer.

The preparation of the polyvinyl chloride resin composition is easily accomplished by conventional procedures. The selected stabilizer combination is formed as above, and then is blended with the polyvinyl chloride resin, or alternatively, the components are blended individually in the resin, using, for instance, a two or three roll mill, at a temperature at which the mix is fluid and thorough blending facilitated, milling the resin composition including any plasticizer at from 250° to 375° F. For a time sufficient to form a homogeneous mass, five minutes, usually. After the mass is uniform, it is sheeted off in the usual way.

For the commercial processing of rigid polyvinyl chloride, the stabilizer is conveniently mixed with all or a portion of the polymer to be stabilized with vigorous agitation under such conditions of time and temperature that the stabilizer is sufficiently imbibed by the polymer to produce a dry, free-flowing powder. The well-known Henschel mixer is well suited to this procedure.

The following examples in the opinion of the inventor represent preferred embodiments of this invention:

[EXAMPLE 1]

[A series of rigid or nonplasticized formulations was prepared having the following composition.]

| [Ingredients: | Parts by weight |
|---|---|
| Polyvinyl chloride homopolymer (Diamond 40) | 100. |
| Stabilizer | As shown in Table I] |

[The stabilizer concentrations used in each sample of resin tested contained the amount of tin, shown in Table I below per 100 parts of resin.]

[The stabilizer components were first mixed together in the proportions indicated in Table I below, and were then mixed in the resin on a two roll mill to form a homogeneous sheet, and sheeted off. Strips were cut off from the sheet and heated in an oven at 375° F. for two hours to determine heat stability. Pieces of each strip were removed at 15 minute intervals and affixed to cards to show the progressive heat deterioration. The appearance of the samples is reported in Table I below.]

[TABLE I

| Examples | | | | | | | |
|---|---|---|---|---|---|---|---|
| Control A | Amt. | Example 1 | Amt. | Example 2 | Amt. | Control B | Amt. |
| Stabilizer composition | | | | | | | |
| Monobutyltin tris (iso- | | Monobutyltin tris(iso-octyl thioglycolate | 1.90 | Monobutyltin tris(iso-octyl thioglyoclate | 1.35 | | |

[TABLE I-continued

| | octyl thioglycolate) Tin (g.) 2.7 | Dibutyltin sulfide 0.410 Tin (g.) | 0.3 | Dibutyltin sulfide 0.422 Tin (g.) | 0.5 | Dibutyltin sulfide 0.430 Tin (g.) | 1.0 |
|---|---|---|---|---|---|---|---|
| Time (min.) | Color | Color | | Color | | Color | |
| Initial | Colorless | Colorless | | Colorless | | Colorless. | |
| 15 | Slight yellow tint | Very slight yellow tint | | Very slight yellow tint | | Yellow. | |
| 30 | Very light yellow | Slight yellow tint | | Slight yellow tint | | " | |
| 45 | Light yellow | Very light yellow | | Very light yellow | | " | |
| 60 | Yellow | Light yellow | | " | | " | |
| 75 | Charred yellow | yellow | | Light yellow | | Dark yellow | |
| 90 | Black | Charred yellow | | Charred yellow | | Brown. | |
| 105 | | Black | | Black] | | | |

[The results clearly indicate the improved effectiveness obtainable by combinig dibutyltin sulfide, the highly concentrated organotin compound, with monobutyltin tris(isoctyl thioglycolate). The stabilizer combinations of this invention, 2.2 parts per 100 parts resin, as exemplified by Example 1, and 1.85 parts per 100 parts resin, as exemplified by Example 2, provided a very lightly colored, clear composition after 30 minutes of heating at 375° F. that was no more discolored than Control A, containing monobutyltin tris(isooctyl thioglycolate) in a higher total amount of stabilizer, i.e. 2.7 parts by weight per 100 parts resin, after 15 minutes of heating. The degree of discoloration shown by Control A after 30 minutes was maintained by the sample of Example 1 for 45 minutes and by the sample of Example 2 for 60 minutes of heating. Thus, the stabilizer compositions of this invention considerably extend the processing period for resins before harmful discoloration appears. Control B, containing dibutyltin sulfide alone, showed undesirable initial and early properties, i.e. the formation of a yellow discoloration in the resin within only 15 minutes after heating had begun.]

[TABLE II

| | Examples | | | | | | | | | |
|---|---|---|---|---|---|---|---|---|---|---|
| | Control C | Amt. | Example 3 | Amt. | Example 4 | Amt. | Example 5 | Amt. | Control D | Amt. |
| | Stabilizer composition | | | | | | | | | |
| | Monobutyltin tris (iso-octylthio-glycolate) Tin (g.) | 2.2 0.334 | Monobutyltin tris (isooctylthio-glycolate) Dibutyltin sulfide Tin (g.) | 1.76 0.44 0.465 | Monobutyltin tris (isoocytylthio-glycolate) Dibutyltin sulfide Tin (g.) | 1.605 0.595 0.530 | Monobutyltin tris (isooctylthio-glycolate) Dibutyltin sulfide Tin (g.) | 1.425 0.775 0.564 | Dibutyltin sulfide Tin (g.) | 2.2 0.980 |
| Time (min.) | Color | | Color | | Color | | Color | | Color | |
| Initial | Colorless | | Colorless | | Colorless | | Colorless | | Colorless. | |
| 15 | Very light yellow | | Very slight yellow tint | | Very slight yellow tint | | Very slight yellow tint | | Yellow | |
| 30 | Light yellow | | " | | " | | " | | " | |
| 45 | Yellow | | Very light yellow | | Very light yellow | | Very light yellow | | " | |
| 60 | Dark yellow | | Light yellow | | " | | " | | Dark yellow. | |
| 75 | Black | | Yellow | | Light yellow | | Light yellow | | " | |
| 90 | | | Charred yellow | | Yellow | | Yellow | | " | |
| 105 | | | Black | | Charred yellow | | Charred yellow | | " | |
| 120 | | | | | Black | | Brown | | Yellow-brown.] | |

[EXAMPLES 3 THROUGH 5]

[A series of rigid nonplasticized resin formulations was prepared having the following composition:

| [Ingredients: | Parts by weight |
|---|---|
| Polyvinyl chloride homopolymer (Diamond 40) | 100. |
| Stabilizer combination | As shown in Table II.] |

[The same procedure was followed in preparing and testing the compositions as in Example 1 and the appearance of the samples is reported in Table II below. Each resin sample contained the same total amount of stabilizer, 2.2 parts by weight per hundred parts resin.]

[The results clearly indicate that when used at equal total concentrations by weight, all of the claimed stabilizer combinations, monobutyltin tris(isooctyl thioglycolate) and dibutyltin sulfide, inhibit the deterioration of the resin upon heating at 375° F. for a period of time substantially longer than either component alone and thus increase processing time before a harmful discoloration appears. Control C acquires a very light yellow discoloration within 15 minutes of heating but Examples 3, 4 and 5 maintain a less discolored appearance for 45 minutes of heating. In addition, the resin compositions Examples 3, 4 and 5 containing the novel combination of stabilizers maintain no more than a light discoloration even after 90 minutes of heating at 375° F. Contrarily, Control C, the composition containing the monobutyltin tris(isooctyl thioglycolate), acquires a dark discoloration after 60 minutes and is black after 75 minutes of heating. Control D, although it does not turn black until after two hours of heating, discolors immediately, i.e. after 15 minutes of heating, to a yellow discoloration and maintains this undesirable color during the term of heating, acquiring a darker discoloration after 60 minutes.]

[EXAMPLES 6 THROUGH 8 ]

[Another series of rigid resin formulations was prepared having the following composition:]

| [Ingredients: | Parts by weight |
|---|---|
| Polyvinyl chloride homopoly- | |

-continued

| [Ingredients: | Parts by weight |
|---|---|
| mer (Diamond 40) | 100. |
| Isooctyl epoxy stearate | 3 |
| Stabilizer combination | As shown in Table III.] |

[The same procedure was followed in preparing and testing the compositions as in Example 2 and the appearance of the samples are reported in Table III below. Each resin sample contained the same total amount of stabilizer, 1.5 parts by weight per hundred parts resin.]

[TABLE III

| | Examples | | | | | | | | | |
|---|---|---|---|---|---|---|---|---|---|---|
| | Control E | Amt. | Example 6 | Amt. | Example 7 | Amt. | Example 8 | Amt. | Control F | Amt. |
| | Stabilizer composition | | | | | | | | | |
| | Monobutyltin tris(isooctyl thioglycolate) | 1.5 | Monobutyltin tris(isooctyl thioglycolate) Dibutyltin sulfide | 1.2 0.3 | Monobutyltin tris(isooctyl thioglycolate) Dibutyltin sulfide | 1.095 0.405 | Monobutyltin tris(isooctyl thioglycolate) Dibutyltin sulfide | 0.97 0.53 | Dibutyltin sulfide | 1.5 |
| Time (minutes) | Color | | Color | | Color | | Color | | Color | |
| Initial | Colorless | | Colorless | | Colorless | | Colorless | | Colorless. | |
| 15 | Very light yellow | | Very slight yellow tint | | Very slight yellow tint | | Very slight yellow tint | | Yellow. | |
| 30 | Light yellow | | Very light yellow | | Very light yellow | | Very light yellow | | " | |
| 45 | Yellow | | " | | Light yellow | | Light yellow | | " | |
| 60 | Green | | Light yellow | | " | | " | | Dark yellow. | |
| 75 | Black | | Greenish yellow | | Yellow | | Yellow | | " | |
| 90 | | | Black | | Black | | Green | | " | |
| 105 | | | | | | | Black | | " | |
| 120 | | | | | | | | | Very dark yellow.] | |

[The results of Table III clearly indicate the improved effectiveness obtained by combining dibutyltin sulfide, the highly concentrated organotin compound, with monobutyltin tris(isooctyl thioglycolate) even at the low total proportions by weight in the present example, i.e. 1.5 parts per hundred parts resin. The samples containing the combination of the present invention, Examples 6, 7 and 8, inhibit the deterioration of the resin upon heating at 375° F. for a period of time substantially longer than either component alone. Control E turned a very light yellow within 15 minutes of heating, but Examples 6, 7 and 8 maintained a less discolored appearance until 30 minutes of heating had elapsed.]

[In addition, the resin compositions of Examples 6, 7 and 8 containing the novel combination of stabilizers maintained no more than a light discoloration even after 60 minutes of heating. Contrarily, Control E, the composition containing the monobutyltin tris(isooctyl thioglycolate) alone acquired a dark discoloration after 30 minutes of heating and turned black after 75 minutes of heating. Control F, although it does not turn black until after two hours of heating, discolors immediately, i.e. after 15 minutes of heating to a yellow discoloration. It maintains this undesirable color during the term of heating and becomes a darker discoloration after 75 minutes.]

EXAMPLES [9] *1* THROUGH [11] *3*

A series of rigid nonplasticized formulations was prepared having the following composition:

| Ingredients: | Parts by weight |
|---|---|
| Polyvinyl chloride homopolymer (Diamond 40) | 100. |
| Stabilizer | As shown in Table [IV] *I*. |

The stablizer combinations used in each sample of resin tested contained the same total amount of tin, i.e. 0.55 part per 100 parts of resin. The same procedure was followed in preparing and testing the resins as in Example 1 and the appearance of the test samples are set out in Table [IV] *I*.

TABLE *I*[IV]

| | Examples | | | | | | | | | |
|---|---|---|---|---|---|---|---|---|---|---|
| | Control *A*[G] | Amt. | Example *1*[9] | Amt. | Example *2*[*10*] | Amt. | Example *3*[11] | Amt. | Control *B*[H] | Amt. |
| | Stabilizer composition | | | | | | | | | |
| | Dibutyltin bis-(isooctylthio-glycolate) | 2.96 | Dibutyltin bis-(isooctylthio-glycolate) Butyltin sesqui-sulfide | 2.52 0.15 | Dibutyltin bis (isooctylthio-glycolate) Butyltin sesqui-sulfide | 2.07 0.30 | Dibutlytin bis-(isooctylthio-glycolate) Butyltin sesqui-sulfide | 1.48 0.5 | Butyltin sesqui-sulfide | 1.0 |
| Time (min.) | Color | | Color | | Color | | Color | | Color | |
| Initial | Colorless | | Colorless | | Colorless | | Colorless | | Colorless. | |
| 15 | Very light yellow | | Very slight yellow tint | | Very slight yellow tint | | Very slight yellow tint | | Light yellow. | |
| 30 | " | | " | | " | | " | | Light tan. | |
| 45 | Light yellow | | " | | " | | " | | Tan. | |
| 60 | " | | Very light yellow | | Very light yellow | | Very light yellow | | Dark tan. | |
| 75 | " | | " | | " | | " | | Brown. | |
| 90 | Light yellow with brown corners | | " | | " | | Light tan | | Black. | |
| 105 | Light yellow with brown edges. | | Light yellow with brown corners. | | Light yellow | | " | | | |

TABLE *I*[IV]-continued

| | | | | |
|---|---|---|---|---|
| 120 | Yellow with brown edges. | Light yellow with brown edges. | Light yellow with brown corners. | Tan |

The advantages of using the combinations of this invention in Examples [9, 10 and 11] *1,2 and 3* are clearly shown over the use of the components alone in Controls [G and H] *A and B* when used at equal parts of tin per 100 parts of resin. As shown in Control [G,] *A*, the dibutyltin bis(isooctyl thioglycolate), acquires a very light yellow discoloration within the first 15 minutes of heating. Examples [9 through 11] *1 to 3* maintain a lighter color for more than 45 minutes and do not show the same discoloration until after 60 minutes of heating have elapsed. This shows that the combination of this invention is four times as effective in stabilizing the resin at equal parts of tin. In addition, the total amount of stabilizer added is substantially lower in Examples [9 through 11] *1 to 3* as compared to Control [G.] *A*. Control [H] *B* turns a light yellow color within 15 minutes after heating and Examples [9 through 11] *1 through 3* do not become this discolored until after 90 minutes of heating.

The stabilizer composition of this invention are advantageously used in resins formed into many useful structural members including extruded polyvinyl chloride pipe useful for water, brine, crude petroleum, gasoline, natural and manufactured fuel gas, and domestic and industrial wastes; flat and corrugated profiles for the construction industry, and blow-molded bottles. Typical formulations are as follows:

Pipe

| Composition: | Parts by weight |
|---|---|
| Medium mol. wt. polyvinyl chloride homopolymer (K=55) | 100 |
| ABS polymer | 10 |
| Calcium stearate | 1 |
| Dibutyltin sulfide | 0.5 |
| *Di*-n-butyltin bis(isooctyl thioglycolate) | 0.9 |
| Pigment | As desired |

Parisons for blow-molding bottles

| Composition: | Parts by weight |
|---|---|
| Medium mol. wt. polyvinyl chloride homopolymer(K=55) | 100 |
| Styrene - butadiene - methyl methacrylate polymer | 10 |
| Stearic acid | 0.5 |
| n-Butyltin sesquisulfide | 0.5 |
| Di-n-butyltin bis(n-dodecyl thioglycolate) | 1.1 |
| Blue dye | 0.0005–0.002 |

Food-grade bottles

| Composition: | Parts by weight |
|---|---|
| Medium mol. wt. polyvinyl chloride homopolymer (K=55) | 100 |
| ABS polymer | 10 |
| n-Octyltin sequisulfide | 0.5 |
| Di-n-octyltin bis(isooctyl thioglycolate) | 0.95 |
| Di-n-octyltin oxide | 0.05 |

Profiles

| Composition: | Parts by weight |
|---|---|
| High mol. wt. polyvinyl chloride homopolymer(K=70) | 100 |
| Chlorinated polyethylene (31% Cl) | 15 |
| Isooctyl epoxystearate | 2 |
| Di-n-octyltin sulfide | 0.75 |
| *Di*-n-butyltin *bis*[tris](isooctyl thioglycolate) | 1.0 |
| Magnesium stearate | 0.25 |

These formulations each contain sufficient stabilizer in accordance with the invention to be processed at elevated temperatures into the desired shapes without deleterious discoloration or embrittlement.

Having regard for the foregoing disclosure, the following is claimed as the inventive and patentable embodiments thereof:

1. A stabilizer composition for improving the resistance to deterioration of polyvinyl chloride resins when heated at 350° F., consisting essentially of an organotin alpha- or beta-mercapto carboxylic acid ester having the formula $$[R_2'-Sn+S-Z-(COOR'')_m-]_{4-m}]$$
$$R_2'Sn-[S-Z_1-(COOR'')_m]_2$$

wherein R' is an alkyl radical linked to tin through carbon and having from one to about eight carbon atoms, Z is a bivalent alkylene radical having from one to about two carbon atoms, and carrying the —S— and —COOR'' groups, and R'' is an organic group derived from a monohydric or polyhydric alcohol having from one to about two hydroxyl groups and from one to about fifteen carbon atoms, *and* m is an integer from 1 to 2, [and n is an integer from 1 to 2,] the S—Z—(-COOR'')$_m$ group being derived from an alpha- or beta-mercaptocarboxylic acid ester; and an organotin sulfide having the formula $R_2SnS$, in which R is alkyl linked to tin through carbon and has from one to about eight carbon atoms, the organotin compounds together comprising an amount of tin within the range from about 20 to about 35% by weight, and an amount of sulfur within the range from about 10 to about 35% by weight.

2. A stabilizer composition in accordance with claim 1, in which the organotin mercaptocarboxylic acid ester is an organotin thioglycolate.

3. A stablizer composition in accordance with claim 1, in which the organotin sulfide is dibutyl tin sulfide and the organotin mercaptocarboxylic acid ester is [monobutyl] *dibutyl* tin or [monooctyl] *dioctyl* tin [tris(isooctyl] *bis(octyl tin thioglycolate.*

[4. A stabilizer composition according to claim 1, in which n is 1.]

5. A stabilizer composition according to claim [4,] *1,* in which the organotin mercaptocarboxylic acid ester is [monobutyl] *dibutyl* tin [tris(isoocytyl] *bis(isooctyl* thioglycolate) and the organotin sulfide is dibutyl tin sulfide.

6. A stabilizer composition according to claim [4] *1* in which the organotin mercaptocarboxylic acid ester is [monobutyl] *dibutyl* tin [tris(isoocotyl] *bis(isoocotyl* thioglycolate) and the organotin sulfide is dioctyl tin sulfide.

7. A stabilizer composition according to claim [4,] *1* in which the organotin mercaptocarboxylic acid ester is [monobutyl] *dibutyl* tin [tris(isooctyl] *bis(isooctyl* thioglycolate).

8. A stabilizer composition according to claim [4,] *1* in which the organotin sulfide is dibutyl tin sulfide.

9. A polyvinyl chloride resin composition having an enhanced resistance to deterioration when heated at 350° F., consisting essentially of a polyvinyl chloride resin and a stabilizer composition in accordance with claim 1.

10. A polyvinyl chloride resin composition in accordance with claim 9 in which the polyvinyl chloride resin is polyvinyl chloride homopolymer.

11. A polyvinyl chloride resin composition in accordance with claim 9 in which the polyvinyl chloride resin is a copolymer of vinyl chloride and vinyl acetate.

12. A polyvinyl chloride resin composition in accordance with claim 9 in which the amount of stabilizer composition is within the range from about 0.25% to about 15% by weight of the composition.

13. A polyvinyl chloride resin composition in accordance with claim 9 including in addition a polyvalent metal salt of an aliphatic fatty acid.

14. A polyvinyl chloride resin composition in accordance with claim 9 including in addition an organic phosphite.

15. A polyvinyl chloride resin composition in accordance with claim 9 including in addition an epoxy compound.

16. A polyvinyl chloride resin composition in accordance with claim 9 including in addition a plasticizer for the resin in an amount in excess of about 15% by weight.

17. A rigid polyvinyl chloride resin composition in accordance with claim 9 comprising a plasticizer in an amount up to about 10% by weight of the composition.

* * * * *

UNITED STATES PATENT AND TRADEMARK OFFICE

CERTIFICATE OF CORRECTION

PATENT NO. : Re. 30,338

DATED : July 15, 1980

INVENTOR(S) : Otto S. Kauder

It is certified that error appears in the above-identified patent and that said Letters Patent are hereby corrected as shown below:

[56] "9/1965" should be --6/1965--

Column 2, last line :

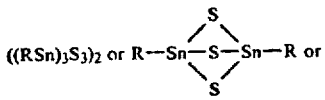

should be

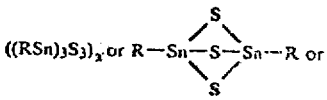

Column 4, line 1 :
first formula $$(Bu_2SnO)_= + mH_2S \longrightarrow m/n(Bu_2SnS)_n + mH_2O$$

should be $$(Bu_2SnO)_m + mH_2S \longrightarrow m/n(Bu_2SnS)_n + mH_2O$$

Column 4, line 6 :
third formula $$2BuSnCl_2 + 3Na_2S \longrightarrow \frac{1}{x}((BuSn)_2S_2)_n + 6NaCl$$

should be $$2BuSnCl_3 + 3Na_2S \longrightarrow \frac{1}{x}((BuSn)_2S_3)_x + 6NaCl$$

UNITED STATES PATENT AND TRADEMARK OFFICE

CERTIFICATE OF CORRECTION

PATENT NO. : Re. 30,338

DATED : July 15, 1980

INVENTOR(S) : Otto S. Kauder

It is certified that error appears in the above-identified patent and that said Letters Patent are hereby corrected as shown below:

Column 4, lines 9 and 10 : fourth formula $$Bu_2SnCl_2 + Na_2O_3 + NaOH \longrightarrow \frac{1}{n}(Bu_2SnS)_n + 2NaCl + NaHSO_3$$

should be $$Bu_2SnCl_2 + Na_2S_2O_3 + NaOH \longrightarrow \frac{1}{n}(Bu_2SnS)_n + 2NaCl + NaHSO_3$$

Column 5, line 17 : "and" should be in italics.

Column 5, line 38 : "isoctyl" should be -- isooctyl--.

Column 6, Formula 1 :

1.

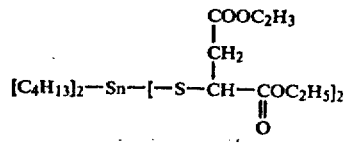

should be

1.

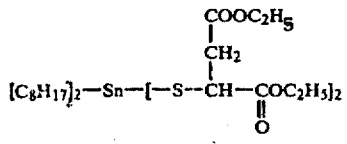

UNITED STATES PATENT AND TRADEMARK OFFICE

CERTIFICATE OF CORRECTION

PATENT NO. : Re. 30,338

DATED : July 15, 1980

INVENTOR(S) : Otto S. Kauder

It is certified that error appears in the above-identified patent and that said Letters Patent are hereby corrected as shown below:

Column 6, Formula 3 :

$$(n\text{-}C_3H_7)_2\text{—}Sn\text{—}[S\text{—}CH_2CH_2\text{—}\underset{\underset{O}{\|}}{C}\text{—}O\text{—}CH_2CH_2\text{—}O\text{—}CH_2CH_2OH]_3$$

should be $$(n\text{-}C_3H_7)_2\text{—}Sn\text{—}[S\text{—}CH_2CH_2\text{—}\underset{\underset{O}{\|}}{C}\text{—}O\text{—}CH_2CH_2\text{—}O\text{—}CH_2CH_2OH]_2$$

Column 6, Formula 4 :

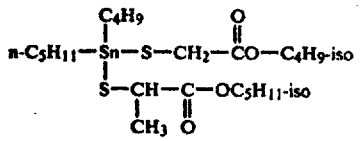

should be

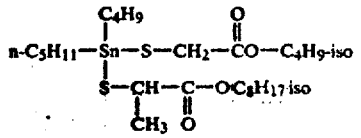

Column 7, formula 15 :

$$[CH_3]_2Sn\text{—}[S\text{—}CH_2\text{—}COOCH_2CH_3]_3$$

should be $$[CH_3]_2Sn\text{—}[S\text{—}CH_2\text{—}COOCH_2CH_3]_2$$

UNITED STATES PATENT AND TRADEMARK OFFICE

CERTIFICATE OF CORRECTION

PATENT NO. : Re. 30,338

DATED : July 15, 1980

INVENTOR(S) : Otto S. Kauder

It is certified that error appears in the above-identified patent and that said Letters Patent are hereby corrected as shown below:

Column 12, line 26 : "For" should be --for--.

Column 12, Table I under heading Amt. Example 2 : "thioglyoclate" should be --thioglycolate--

Column 12, Table I under heading Control A :

| Control A | |
|---|---|
| Monobutyltin tris (iso- | |

should be

| Control A | |
|---|---|
| Monobutyltin tris (iso- | |
| octyl thioglycolate) | 2.7 |

Column 13, line 1 : Please delete "octyl thioglycolate) 2.7"

Column 13, line 15 : "combinig" should be --combining--.

Column 13, Table II under heading Amt. Example 4 : "(isoocytylthio" should be --(isooctylthio--

UNITED STATES PATENT AND TRADEMARK OFFICE

CERTIFICATE OF CORRECTION

PATENT NO. : Re. 30,338

DATED : July 15, 1980

INVENTOR(S) : Otto S. Kauder

It is certified that error appears in the above–identified patent and that said Letters Patent are hereby corrected as shown below:

Column 14, line 68 : Please delete "Polyvinyl chloride homopoly-"

Column 15, line 2 :

| [Ingredients: | Parts by weight |
|---|---|
| mer (Diamond 40) | 100. |

should be

| [Ingredients: | Parts by weight |
|---|---|
| Polyvinyl chloride homopolymer (Diamond 40) | 100. |

Column 17, line 28 : "composition" should be --compositions--.

Column 18, line 42 :

$$S—Z—(-COOR'')_m$$

should be $$S—Z—(COOR'')_m$$

Column 18, line 68 : "[tris(isoocotyl]" should be --[tris(isooctyl]--.

Column 18, line 68 : bis(isoocotyl" should be --bis(isooctyl--.

Signed and Sealed this

*Thirtieth* Day of *December 1980*

[SEAL]

*Attest:*

SIDNEY A. DIAMOND

*Attesting Officer*

*Commissioner of Patents and Trademarks*